US011027294B2

(12) United States Patent
Roy et al.

(10) Patent No.: US 11,027,294 B2
(45) Date of Patent: Jun. 8, 2021

(54) AIRBORNE MATERIAL SPREADING ASSEMBLY AND METHOD FOR SPREADING MATERIAL

(71) Applicant: CONSEILLER FORESTIER ROY INC., Saguenay (CA)

(72) Inventors: Antoine Roy, Ville de Saguenay (CA); Johnny Guérin, Alma (CA); Samuel Turcotte, Alma (CA)

(73) Assignee: CONSEILLER FORESTIER ROY INC., Saguenay (CA)

( * ) Notice: Subject to any disclaimer, the term of this patent is extended or adjusted under 35 U.S.C. 154(b) by 408 days.

(21) Appl. No.: 15/964,605

(22) Filed: Apr. 27, 2018

(65) Prior Publication Data
US 2019/0001352 A1 Jan. 3, 2019

Related U.S. Application Data

(60) Provisional application No. 62/526,647, filed on Jun. 28, 2017.

(30) Foreign Application Priority Data

Jun. 29, 2017 (CA) .................................. CA 2972055

(51) Int. Cl.
*B05B 3/02* (2006.01)
*B05B 3/04* (2006.01)
(Continued)

(52) U.S. Cl.
CPC .............. *B05B 3/0409* (2013.01); *B05B 3/02* (2013.01); *B05B 3/025* (2013.01); *B05B 3/16* (2013.01);
(Continued)

(58) Field of Classification Search
CPC ......... B05B 3/02; B05B 3/025; B05B 3/0409; B05B 7/1404; B64C 2201/128; B64D 1/16
See application file for complete search history.

(56) References Cited

U.S. PATENT DOCUMENTS 287,508 A * 10/1883 Didiot ...................... B05B 3/02
                                                   239/225.1
497,413 A *  5/1893 Ruble ...................... B05B 3/02
                                                   239/225.1
(Continued)

FOREIGN PATENT DOCUMENTS

AU      2015100998 A4    12/2015
AU      2015101838 A4     2/2016
(Continued)

OTHER PUBLICATIONS

Skyfront, "Tailwind Hybrid-Electric Drone, Copyright 2017", http://skyfront.com/#.
(Continued)

*Primary Examiner* — Richard G Davis
(74) *Attorney, Agent, or Firm* — Tucker Ellis LLP

(57) ABSTRACT

A spreading assembly is provided. The spreading assembly comprises a spreadable material container, a spreading mechanism, and a motor. The spreading mechanism is rotatably mounted to a bottom section of the material container and can disperse the spreadable material 360° around the spreading assembly. The motor is operatively connected to the spreading mechanism to engage same in rotation. The spreading assembly comprises a coupling assembly to engage the spreading assembly with an unmanned aerial vehicle (UAV) configured to transport the spreading assembly while it operates.

22 Claims, 10 Drawing Sheets

Figure 1:
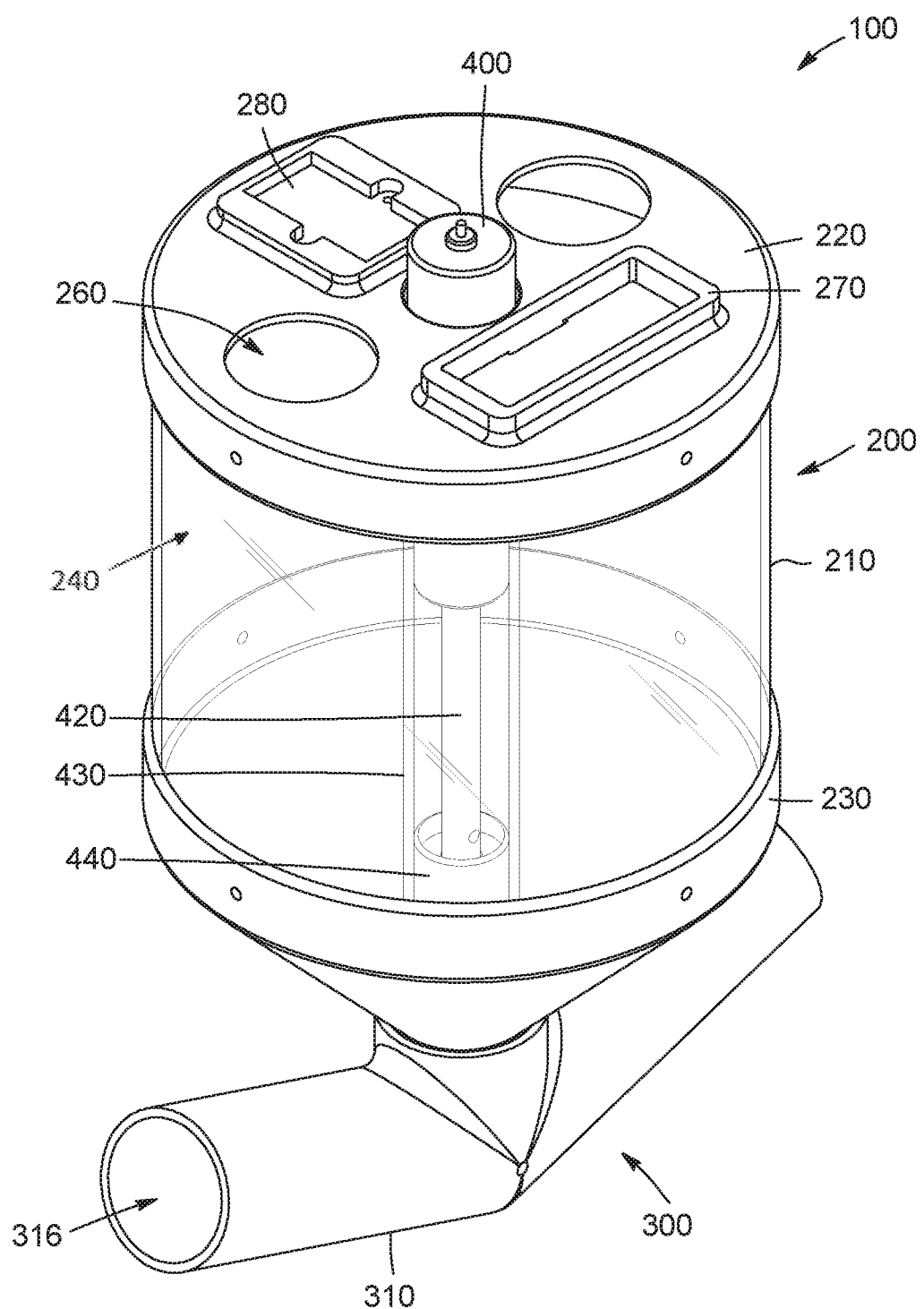

(51) Int. Cl.
   *B64C 39/02* (2006.01)
   *B05B 12/08* (2006.01)
   *B05B 3/16* (2006.01)
   *B05B 7/14* (2006.01)
   *B05B 13/00* (2006.01)
   *B64D 1/12* (2006.01)

(52) U.S. Cl.
   CPC .......... *B05B 7/1404* (2013.01); *B05B 12/087* (2013.01); *B05B 13/005* (2013.01); *B64C 39/024* (2013.01); *B05B 12/08* (2013.01); *B64C 2201/128* (2013.01); *B64D 1/12* (2013.01)

(56) References Cited

U.S. PATENT DOCUMENTS

| | | | | |
|---|---|---|---|---|
| 3,737,101 | A * | 6/1973 | Johnson | B01F 3/04028 239/225.1 |
| 3,920,184 | A * | 11/1975 | Waldrum | A01C 7/004 239/10 |
| 6,393,241 | B1 * | 5/2002 | Matsumoto | G03G 15/0822 399/258 |
| 9,381,646 | B1 | 7/2016 | Fryshman | |
| 9,505,496 | B2 | 11/2016 | Markov | |
| 10,139,007 | B1 * | 11/2018 | Wulf | F16K 31/02 |
| 10,569,877 | B2 * | 2/2020 | Miller | B05B 7/1436 |
| 2016/0050840 | A1 | 2/2016 | Sauder et al. | |
| 2016/0307448 | A1 | 10/2016 | Salnikov et al. | |
| 2017/0015416 | A1 | 1/2017 | O'Connor et al. | |
| 2017/0029099 | A1 | 2/2017 | Chen | |
| 2017/0280678 | A1 * | 10/2017 | Jones | B64C 39/024 |
| 2019/0009907 | A1 * | 1/2019 | Wu | A01G 25/16 |

FOREIGN PATENT DOCUMENTS

| | | |
|---|---|---|
| CN | 104401491 A | 3/2015 |
| CN | 204197294 U | 3/2015 |
| CN | 105173084 A | 12/2015 |
| CN | 205311910 U | 6/2016 |
| CN | 205738104 U | 11/2016 |
| WO | 2015161352 A1 | 10/2015 |
| WO | 2016192024 A1 | 12/2016 |

OTHER PUBLICATIONS

Kelsey D. Atherton, "This Drone Sprays Pesticides Around Crops", Japan, Jun. 23, 2016, Popular Science, http://www.popsci.com/agri-drone-is-precision-pesticide-machine.

Droneseed, "Forestry Services", Seattle, Washington, downloaded Apr. 20, 2018, https://droneseed.co/.

AGflyers, "Looking for solution for seed spreader from drone . . . ", Copyright 2010-2018, http://agflyers.com/forums/topic/looking-for-solution-for-seed-spreader-from-drone/.

Alibaba, "RTK Uav Drones Sprayer Seeder for Wholesales", Copyright 1999-2018, https://www.alibaba.com/products/drones_sprayer_seeder.html.

* cited by examiner

AIRBORNE MATERIAL SPREADING ASSEMBLY AND METHOD FOR SPREADING MATERIAL

CROSS-REFERENCE TO RELATED APPLICATIONS

This application claims priority under 35 U.S.C. § 119(e) of U.S. provisional patent application No. 62/526,647 and Canadian patent application no. 2,972,055 filed on Jun. 29, 2017, the specifications of which are hereby incorporated by reference in their entireties.

TECHNICAL FIELD

The technical field generally relates to spreading assemblies and, more particularly, an airborne spreading assembly. The spreading assembly can include or be mounted to an unmanned aerial vehicle for carrying same. The spreading assembly is configured to spread materials including, but not limited to granular materials. The technical field also relates to a method for spreading material.

BACKGROUND

Automation is increasingly present in our daily lives and spreaders have begun to follow this trend. In fact, spreaders can now be mounted to unmanned aerial vehicles in order to be operated remotely.

UAV-mounted spreaders typically include a spreading or dispersing mechanism in order to spread material contained within the spreader. When the material being spread is in the form of a fluid, the spreaders can be equipped with a corresponding liquid sprayer. Currently, many of the spreading mechanisms on the market are derived from manual spreaders which are usually used in personal gardens and/or backyards. One drawback of these spreaders is that they do not offer full 360-degree coverage when being operated as the user would not want to have material spread/sprayed on his person. In addition, when operating these spreaders, there is no control on exactly where the material is spread, nor is there control over the amount of material being spread.

In view of the above, many challenges still exist in the field of spreaders mounted to UAVs.

SUMMARY

According to an aspect, a spreading assembly for dispersing spreadable material is provided. The spreading assembly including a spreadable material container defining a container interior volume and having at least one material outlet opening in material communication with the container interior volume and through which the spreadable material contained in the container interior volume can exit. The spreading assembly also includes a spreading mechanism rotatably mounted to the spreading container, the spreading mechanism including a dispersion tube having at least a section extending outwardly of the spreadable material container. The dispersion tube having at least one inlet aperture being in material communication with the container interior volume to allow a flow of the spreadable material between the container interior volume and the dispersion tube, the dispersion tube having at least one outlet aperture through which the spreadable material can exit the dispersion tube and be dispersed in an area surrounding the spreading assembly. The spreading assembly also includes a motor operatively connected to the dispersion tube of the spreading mechanism to engage the dispersion tube in rotation.

According to a possible embodiment, the spreadable material container includes a coupling assembly engageable with an unmanned aerial vehicle ("UAV"). The coupling assembly includes a spreader attachment secured to the spreading assembly, a UAV attachment secured to the UAV and an attachment coupler connecting the UAV attachment and the spreader attachment together and defining at least one pivot axis between the UAV attachment and the spreader attachment in order to maintain the spreading assembly in a substantially upright position.

According to another possible embodiment, the spreadable material container includes a lid having at least one inlet opening through which the spreadable material can be fed into the container interior volume. The coupling assembly being connected to the lid.

According to yet another possible embodiment, the at least one material outlet opening is defined in a bottom portion of the spreadable material container, and the bottom portion of the spreadable material container is tapered inwardly to direct the spreadable material towards the at least one material outlet opening.

According to some embodiments, the spreading mechanism is rotatable about 360 degrees to spread the spreadable material in an area surrounding the spreading assembly. The dispersion tube is V-shaped and the at least one outlet aperture includes two outlet apertures disposed at opposite ends of the dispersion tube. Moreover, a distance between a nadir of the dispersion tube and one of the outlet apertures is between about 3 cm and about 100 cm, and the V-shaped dispersion tube defines an inner angle between about 60 degrees and about 179 degrees.

According to other possible embodiments, the spreading assembly further includes a shaft operatively connected to the motor, the shaft extending within the container interior volume and being operatively connected to the dispersion tube at the nadir thereof. A lower section of the shaft extends through the material outlet opening with a diameter of a section of the shaft extending through the material outlet opening being smaller than a diameter of the material outlet opening to allow the spreadable material contained in the container interior volume to exit through the material outlet opening and flow into the dispersion tube.

According to another possible embodiment, the spreading assembly further includes a flow adjustment mechanism adapted to control the rate at which the spreadable material exits the container interior volume and flows into the dispersion tube.

According to another possible embodiment, the lower section of the shaft is threaded, and the flow adjustment mechanism includes a set screw operatively engaged with the dispersion tube, the set screw extending within the lower section of the shaft to selectively displace the dispersion tube with respect to the spreadable material container by rotation thereof.

According to other possible embodiments, the motor and shaft include a protective shell secured to a lid of the spreadable material container and extending through the container interior volume, the protective shell surrounding and isolating a bottom portion of the motor and a section of the shaft from the spreadable material within the container interior volume. The protective shell includes at least one shell opening defined in a lower section thereof to allow the spreadable material contained in the container interior volume to flow therethrough and into the material outlet opening of the spreadable material container.

According to another possible embodiment, the shaft includes at least one shaft stabilizer mounted along the shaft within the protective shell to stabilize movements of the shaft, the at least one shaft stabilizer having at least one bearing surrounding the shaft and contacting the protective shell.

According to another possible embodiment, the dispersion tube includes an inner channel in material communication with the at least one material outlet opening and is configured to retain the spreadable material therein when the spreading mechanism is not engaged in rotation. The inner channel of the dispersion tube having a diameter between about 1 cm and about 20 cm.

According to another possible embodiment, the spreading assembly includes a control assembly operatively connected to the motor to control same. The control assembly includes an electronic speed controller (ESC) operatively connected to the motor for controlling same, and a power source operatively connected to the ESC to supply power thereto and being in data communication with a command transceiver to receive a control signal therefrom.

According to another possible embodiment, the power source is a battery pack.

According to another aspect, an unmanned aerial vehicle ("UAV") for dispersing a spreadable material over a field is provided. The UAV includes the spreading assembly as described above and also includes a UAV controller operatively connected thereto to control the UAV.

According to one embodiment, the spreading assembly further includes a control assembly operatively connected to the motor to control same, the control assembly and the UAV controller being remotely operated by a single remote control.

According to yet another aspect, a method for spreading spreadable material in an area is provided. The method can include the steps of providing a UAV as described above and remotely controlling the UAV and/or spreading assembly via remote control to spread spreadable material.

BRIEF DESCRIPTION OF THE DRAWINGS

FIG. 1 is a perspective view of a spreading assembly in accordance with an embodiment, wherein a peripheral wall of a spreadable material container is made of a substantially clear material;

FIG. 2 is a perspective view of a spreadable material container of the spreading assembly of FIG. 1 in accordance with an embodiment;

FIG. 3 is a perspective view of a spreading mechanism of the spreading assembly of FIG. 1 in accordance with an embodiment;

FIG. 4 is a side elevation view of the spreading assembly of FIG. 1;

FIG. 4A is a sectional view of the spreading assembly taken along cross-section lines 4A-4A of FIG. 4;

FIG. 5A is a sectional view of a spreading assembly in accordance with an embodiment, showing a spreading mechanism adjusted to minimize the rate of spread.

FIG. 5B is a sectional view of a spreading assembly in accordance with an embodiment, showing a spreading mechanism adjusted to maximize the rate of spread.

FIG. 6 is an exploded view of a flow adjustment mechanism in accordance with an embodiment, showing a set screw adapted to extend within a shaft of the spreading assembly.

FIG. 7 is a perspective view of the spreading assembly of FIG. 1 coupled to an unmanned aerial vehicle ("UAV") in accordance with an embodiment.

FIG. 8 is a side elevation view of a coupling assembly for a spreading assembly in accordance with an embodiment;

FIG. 8A is a sectional view of the coupling assembly taken along cross-section 6A-6A of FIG. 6;

FIG. 8B is a perspective view of the coupling assembly of FIG. 6;

FIG. 9 is a bloc-diagram representing a control assembly of the spreading assembly in accordance with an embodiment.

DETAILED DESCRIPTION

It should be understood that the elements of the drawings are not necessarily depicted to scale, since emphasis is placed upon clearly illustrating the elements and structures of the present embodiments. In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

As will be explained below in relation to various embodiments, a spreading assembly for dispersing spreadable material, such as and without being limitative particulate material, is provided. The spreading assembly includes a spreadable material container engageable to an unmanned aerial vehicle, or "UAV", so as to allow the spreading assembly to be operated remotely and in the air. Furthermore, the spreading assembly also includes a spreading mechanism rotatably mounted to the spreadable material container to effectively spread spreadable material (e.g., particulate material) in an area surrounding the spreading assembly using centrifugal forces. Finally, the spreading assembly includes a motor operatively connected to the spreading mechanism in order to engage the spreading mechanism in rotation.

In the embodiments described below, the spreading assembly is adapted to contain and spread a particulate material in a surrounding area. However, it is appreciated that it can be used to spread other spreadable material including, and without being limited to, liquids and/or slurries. It should be understood that the expression "particulate" refers to the characteristic of something being substantially small in size and is intended to include any material in the form of, or including, discrete particles. As such, in this context, "particulate material" can refer to material in the form of minute separable particles.

Referring broadly to FIGS. 1 through 9, a spreading assembly 100 for dispersing spreadable material is provided. The spreading assembly 100 can be coupled to an unmanned aerial vehicle, or "UAV" 500, in order to be operable from the air in a manner that is commonly known in the art of UAVs. In some embodiments, the spreading assembly 100 includes a spreadable material container 200 and a spreading mechanism 300 rotatably mounted to the spreadable material container 200. In addition, the spreading mechanism 300 can be operatively connected to a motor 400, which can, in turn, be mounted to the spreadable material container 200.

The spreading mechanism 300 can be adapted to disperse or spread spreadable material in an area surrounding the spreading assembly 100 in a manner that will be described herein below.

Referring more specifically to FIG. 1, the spreadable material container 200 (hereafter simply "container" 200) can include multiple components assembled together to define a container interior volume 240. In this embodiment, the container includes a main body 210, a lid 220 and a bottom portion 230 connected to one another. More specifically, the lid 220 can be secured to the main body 210 at a top section thereof, and the bottom portion 230 can be connected to a bottom section of the main body 210. In an embodiment, the lid 220 can be detachably engageable and securable to the main body 210 in order to allow access to the container interior volume 240, as will be described in more details below. In some embodiments, the bottom portion 230 can be attached to a peripheral wall of the main body 210 at the bottom section thereof. In an embodiment, the lid 220 and the bottom portion 230 can be attached or secured to the peripheral wall of the main body 210 via any suitable fastening means such as adhesives (e.g. glue) or mechanical fasteners (such as nails, rivets, and/or bolts), for example. Alternatively, the main body 210, the lid 220 and the bottom portion 230 can be threaded along their respective edges to allow the container 200 to be assembled as previously described by "screwing" the lid 220 and the bottom portion 230 to the upper portion of main body 210. However, it is appreciated that the bottom portion 230 and the main body 210 can form a single component of the spreading assembly 100, or that the lid 220 and the main body 210 can form a single component. Finally, it should be noted that the container 200 can be made entirely from a single component, for example by being molded.

Figure 2:
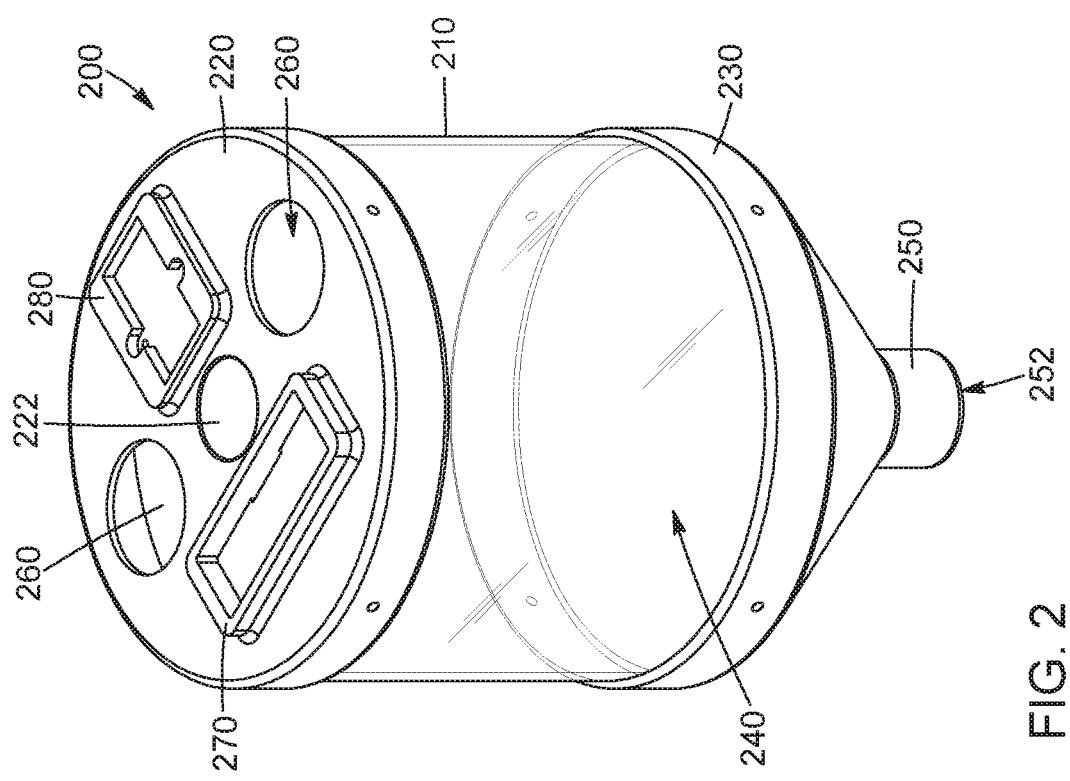

Now referring to FIG. 2, in addition to FIG. 1, it should be understood that the container interior volume 240 is adapted for containing a certain amount of spreadable material, such as particulate material. Therefore, the container 200 can include at least one outlet 250 defining a material outlet opening 252 through which the spreadable material can exit the container interior volume 240. In the present embodiment, the container 200 includes a single material outlet opening 252 located in the bottom portion 230 and, more particularly, at a nadir of the container 200. It should be understood that the outlet opening 252 is in material communication with the interior volume 240 to allow the spreadable material to exit said interior volume 240.

In some embodiments, the container 200 can be generally cylindrical in shape and can have a diameter ranging between about 10 cm and about 50 cm. However, it is appreciated that, in other embodiments, the container 200 can have any suitable shape and size adapted to cooperate with the UAV model that the spreading assembly 100 is to be coupled with.

Moreover, the main body 210, the lid 220 and/or the bottom portion 230 can be made from any suitable material. More particularly, the container components can be made from non-corrosive material, such as and without being limitative, plastics or carbon fiber, which can be molded into the required shape and size. Alternatively, the container components can be made from non-corrosive metals, such as stainless steel, or light metals such as aluminium. However, a person skilled in the art will appreciate that any other suitable material and/or method can be used to shape the different components of the container 200. In the present embodiment, the peripheral wall of the main body 210 is made from a clear material to allow the content of the interior volume 240 to be visible from the outside. The clear material allows the user to notice or anticipate when additional spreadable material will need to be added. However, the main body 210 can alternatively be made from non-clear material, such as the aforementioned carbon fiber, as it can be suitable when combining the spreading assembly 100 with certain types of UAVs.

Still referring to FIG. 2, the bottom portion 230 of the container 200 can be tapered inwardly, extending centrally and downwardly from the peripheral wall of the main body 210 to funnel the spreadable material towards the outlet 250 and through the outlet opening 252. In this embodiment, the outlet 250 is located generally in a center of the bottom portion 230 to facilitate the communication of spreadable material from the interior volume 240 through the outlet opening 252. The outlet 250 can have a generally cylindrical shape thus having a circular cross-section with a diameter ranging between about 1 cm and about 20 cm to be able to adapt to different sizes of particulate material. Alternatively, the outlet 250 can have any suitable shape cross-section such as oval or stadium-shaped, and can have any suitable size/diameter to allow spreadable material to flow therethrough.

In some embodiments, the container 200 can be provided with inlet openings 260 to allow spreadable material to be fed into the interior volume 240 without having to disassemble the lid 220 from the main body 210. In this embodiment, the inlet openings 260 can be provided on the lid 220, but can be provided at any suitable location on the container 200, such as on the main body 210 for example. It should be understood that any suitable amount of inlet openings 260 can be provided on the container 200 (e.g., on the lid 220) to allow spreadable material to be fed/added within the container interior volume 240. However, it should be apparent that the container 200 can be free of inlet openings 260, thus requiring that the lid 220 be removed to add spreadable material within the container interior volume 240. In some embodiments, the inlet openings 260 can include inlet opening caps (not shown) adapted to prevent other substances, such as debris picked up by the wind or rain for example, from involuntarily entering the interior volume 240.

Figure 3:
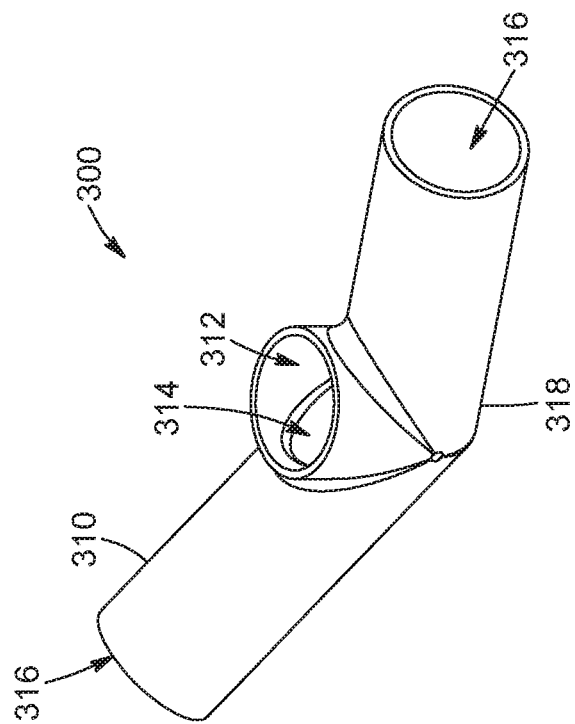

Referring to FIG. 3, in addition to FIGS. 1 and 2, the spreading mechanism 300 according to an embodiment is illustrated. In this embodiment, the spreading mechanism 300 is rotatably mounted to the container 200 and is adapted to disperse, or spread, spreadable material in the area surrounding the spreading assembly 100, such as in a 360-degree plan therearound. In the present embodiment, the spreading mechanism 300 is mounted to the lower portion 230 of the container 200 and extends outwardly therefrom, as shown in FIG. 1. In some embodiments, the spreading mechanism 300 includes a V-shaped dispersion tube 310 having a nadir 318 being substantially aligned with the outlet opening 252 of the container 200. More specifically, the dispersion tube 310 includes an inlet aperture 312 being in material communication with the outlet opening 252 to allow the spreadable material to flow from the container interior volume 240 into the dispersion tube 310. In some embodiments, the inlet aperture 312 can have a diameter that is greater than that of the outlet 250 to allow the outlet 250 to extend through the inlet aperture 312, therefore ensuring that the spreadable material flows within an inner channel 314 of the dispersion tube 310. However, it is appreciated that the outlet 250 can inversely extend over the inlet aperture 312 of the dispersion tube 310. In this embodiment, the inlet aperture 312 is located substantially in the center of the dispersion tube 310, opposite the nadir 318 thereof. As such, the nadir 318 of the dispersion tube 310 substantially corresponds to a lowest section of the dispersion tube 310. Finally, it should be understood that the dispersion tube 310 includes an inner channel 314 and at least one outlet aperture 316 through which the spreadable material can exit the dispersion tube to effectively be dispersed.

Figure 4:
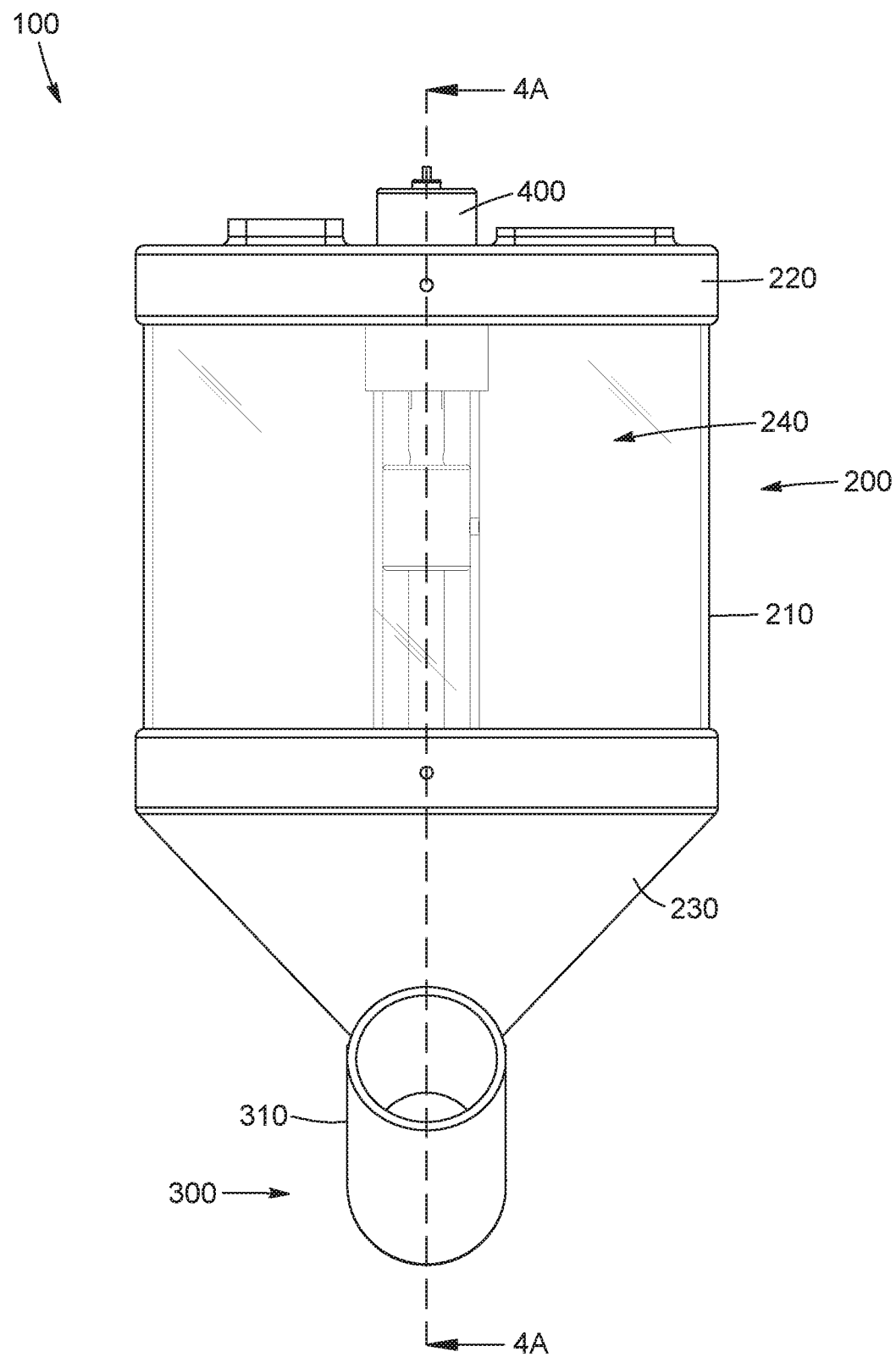
Figure 4A:
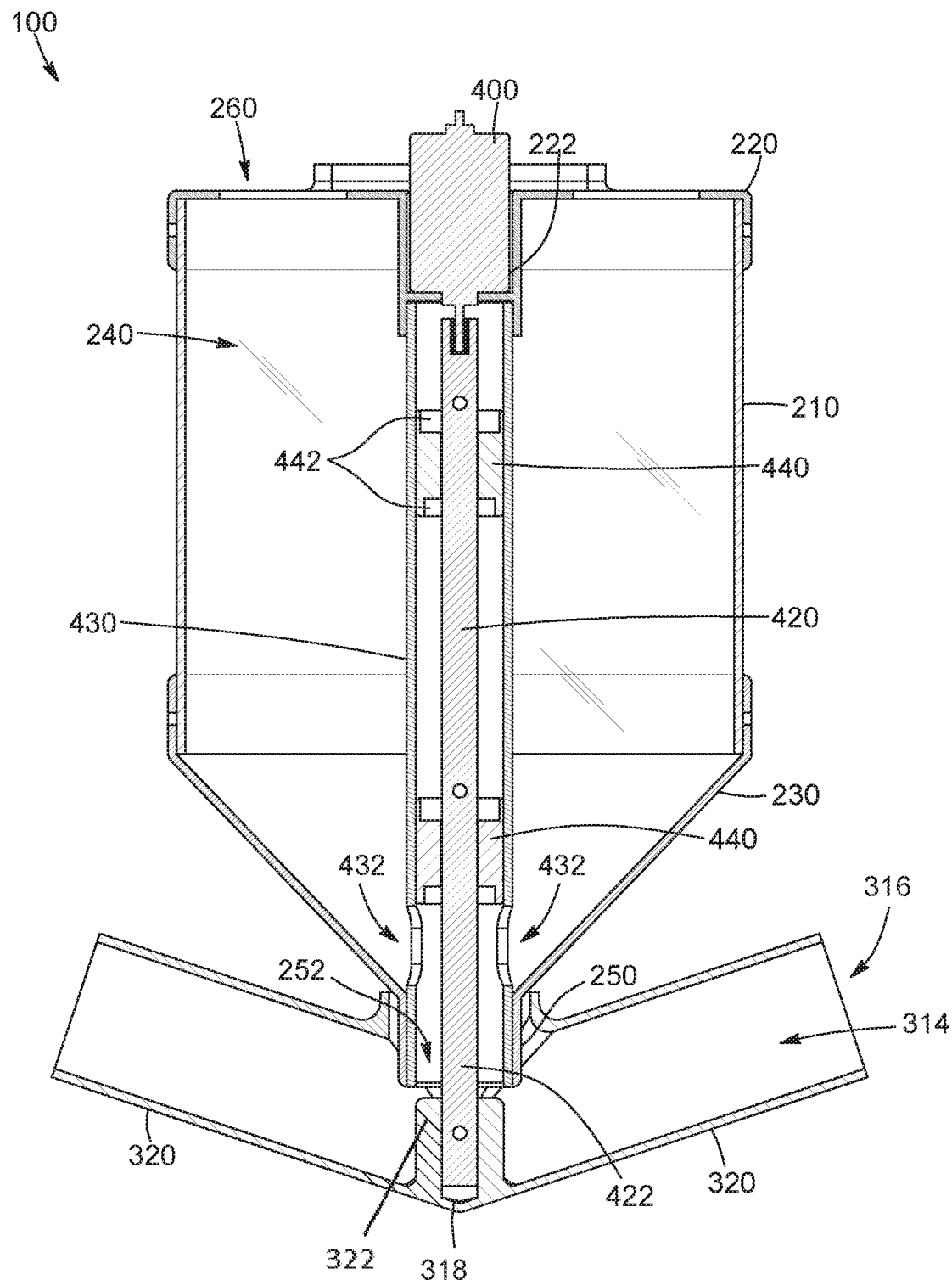

Now referring to FIGS. 4 and 4A, in addition to FIG. 3, the V-shaped configuration of the dispersion tube 310 defines two dispersion tube arms 320, of substantially equal length, extending in opposite directions. Each dispersion tube arm 320 can have an outlet aperture 316 provided at an end thereof, thus providing the dispersion tube 310 with two outlet apertures 316. Alternatively, it should be apparent that the dispersion tube 310 can have any suitable number of outlet apertures 316 from which the spreadable material can exit the dispersion tube arms 320. In the illustrated embodiment, the two outlet apertures 316 of the dispersion tube 310 are provided at opposite ends of said dispersion tube 310 and are elevated due to the generally V-shaped configuration of the dispersion tube 310. In alternative embodiments (not shown), the dispersion tube 310 can have outlet apertures located anywhere along its length in addition to, or in replacement of, the outlet apertures 316 located at the ends of the dispersion tube 310.

It should be noted that the dispersion tube arms 320 define an inner angle therebetween which can range between about 60 degrees and about 179 degrees. Additionally, the dispersion tube arms 320 can have a length ranging between about 3 cm and about 60 cm measured from the nadir 318 of the dispersion tube 310 to one of the outlet apertures 316. Moreover, the inner channel 314 can have a diameter ranging between about 1 cm and about 20 cm to accommodate different sizes and amount of spreadable material. However, it is appreciated that the dispersion tube arms 320 can have any suitable length or position, and that the inner channel 314 can have any suitable diameter to allow a flow of spreadable material therethrough.

It should be understood that rotatably connecting the spreading mechanism 300 to the bottom portion 230 of the container 200 allows the dispersion tube 310 to rotate 360° about the outlet 250, therefore dispersing spreadable material in the area surrounding the spreading assembly 100. Furthermore, the V-shaped configuration of the dispersion tube 310 enables the spreading mechanism 300 to retain the spreadable material within the inner channel 314 while not engaged in rotation. More specifically, when the spreading mechanism 300 is not operated, the spreadable material can still exit the container interior volume 240, but accumulates around the nadir 318 within the inner channel 314 instead of being spread.

Still referring to FIGS. 4 and 4A, it should be understood that the spreading mechanism 300 is engaged in rotation via the motor 400. More specifically, the motor 400 can be operatively connected to the dispersion tube 310 via a shaft 420, and can be adapted to engage the dispersion tube 310 in rotation, independently from the container 200. Therefore, during operation, the spreadable material is "ejected" from the dispersion tube 310 via centrifugal forces created by the rotation of the spreading mechanism 300 induced by the motor 400 and shaft 420 in order to be dispersed around the spreading assembly 100. Additionally, the lid 220 of the container 200 can be provided with a motor receiving sleeve 222 located substantially in the center thereof. The motor receiving sleeve 222 can be shaped and sized to receive therein a section of the motor 400 in order to position the motor 400 with respect to the container 200, as will be described in more details below.

In some embodiments, the shaft 420 is operatively connected to the motor 400 at a top end thereof, and is connected to the dispersion tube 310 at a bottom end, as described above. More specifically, the dispersion tube 310 can include a shaft receiving sleeve 322 extending within the inner channel 314 opposite the nadir 318, and the bottom end of the shaft 420 can be connected to the shaft receiving sleeve 322, protruding inwardly into the inner channel 314, as illustrated in FIG. 4A. Moreover, the motor 400 is illustratively seated within the motor receiving sleeve 222 defined in the lid 220 to at least partially contain and retain the motor 400 therein. However, it is appreciated that the motor 400 can be provided at any suitable location on the spreading assembly 100, such as directly above the spreading mechanism 300 for example. The shaft 420 thus extends from the motor 400, through the container 200, and is operatively connected to the dispersion tube 310. More specifically, the shaft 420 extends through the container interior volume 240 with a lower section 422 of the shaft 420 extending through the outlet opening 252. The lower section 422 can be fixedly secured to the dispersion tube 310, within the shaft receiving sleeve 322 through which it is inserted, using any suitable fastening means, such as a screw and nut, or a bolt for example or by welding. It should be understood that the lower section of the shaft 422 has a diameter which is smaller than the diameter of the outlet opening 252 to allow the spreadable material contained within the container interior volume 240 to exit through the outlet opening 252 despite the shaft 420 extending therethrough.

In some embodiments, the motor 400 and shaft 420 can be provided with a protective shell 430 extending through the container interior volume 240, and being adapted to surround, support, isolate and thus protect the motor 400 and shaft 420 from the spreadable material contained within the container interior volume 240. In this embodiment, the protective shell 430 has two opposite ends respectively secured to the lid 220 and outlet 250. The protective shell 430 is provided with at least one material flow opening 432 defined in a lower section thereof to allow the spreadable material to exit the interior volume 240. In this embodiment, the shaft 420 can be further provided with bushings 440 disposed along a length thereof to minimize vibrations and unwanted movements, and to prevent buckling. In the illustrated embodiment, the shaft 420 is provided with two bushings 440 spaced-apart along the section of the shaft 420 extending through the container interior volume 240. It should be understood that each bushing 440 is positioned between the shaft and protective shell to substantially form a seal within the protective shell 430, effectively protecting the shaft 420. The bushings 440 can be further adapted to protect the motor 400 by preventing any spreadable material that would have entered the protective shell 430 from contacting a bottom portion of the motor 400. Moreover, the bushings 440 can be provided with at least one bearing assembly 442 so as to not impede the rotation of the shaft 420 within the protective shell 430. In this embodiment, each bushing is provided with a pair of bearing assemblies 442 extending between the shaft 420 and protective shell 430. However, it is appreciated that the spreading assembly 100 can be operated without the bushings 440, or that the spreading assembly 100 can be provided with any suitable number of bushings 440, such as one or more than two.

Figure 5A:
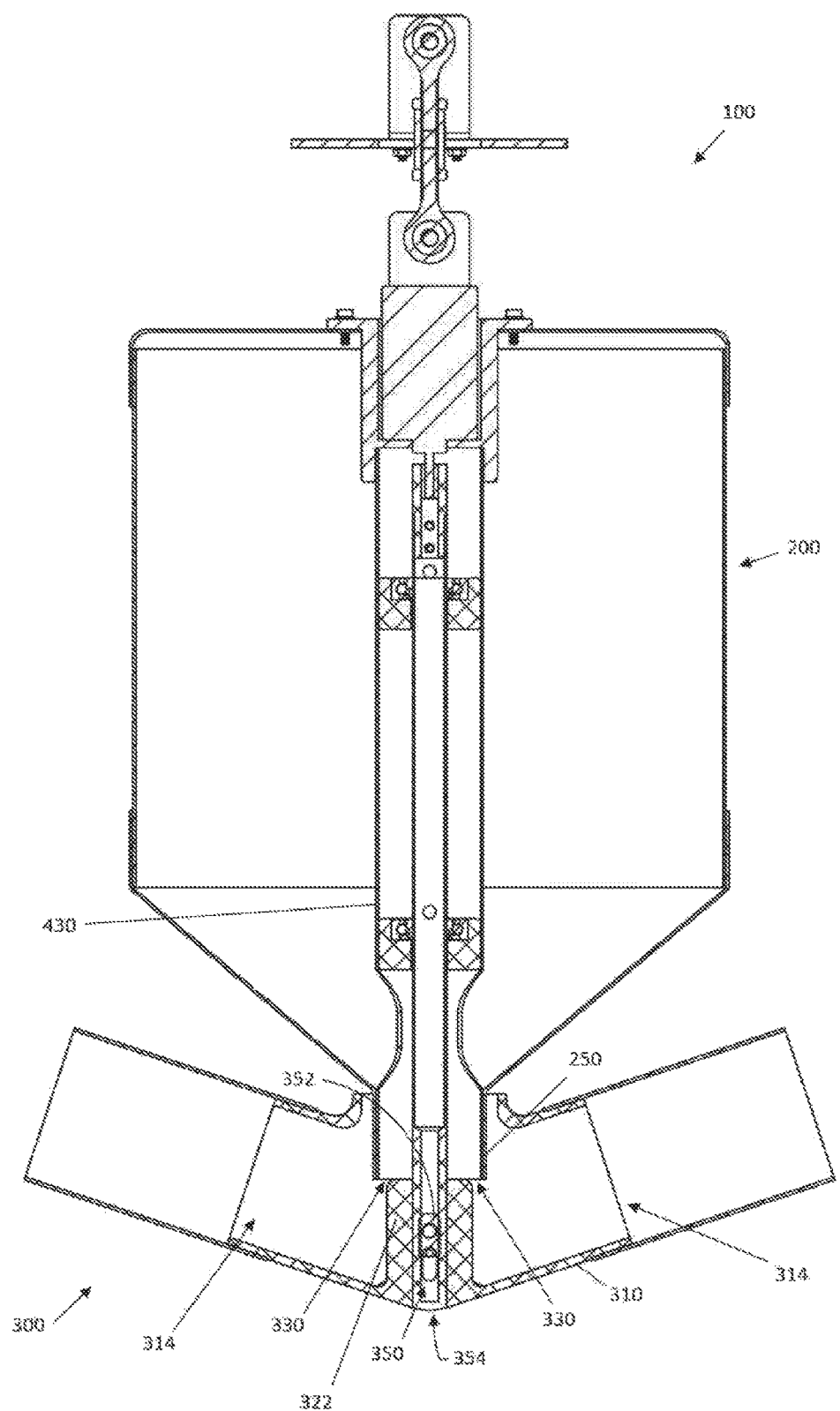
Figure 5B:
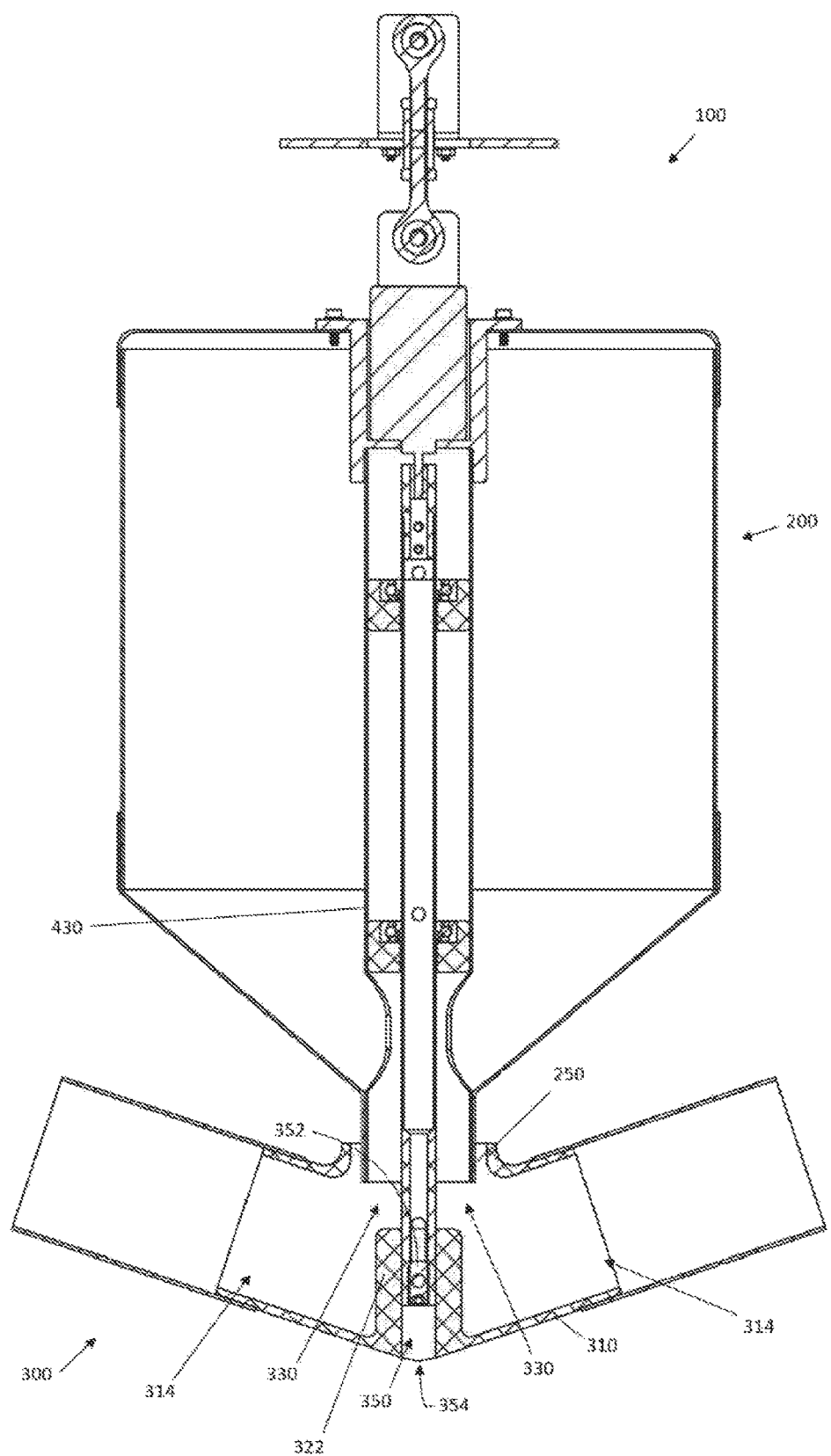
Figure 6:
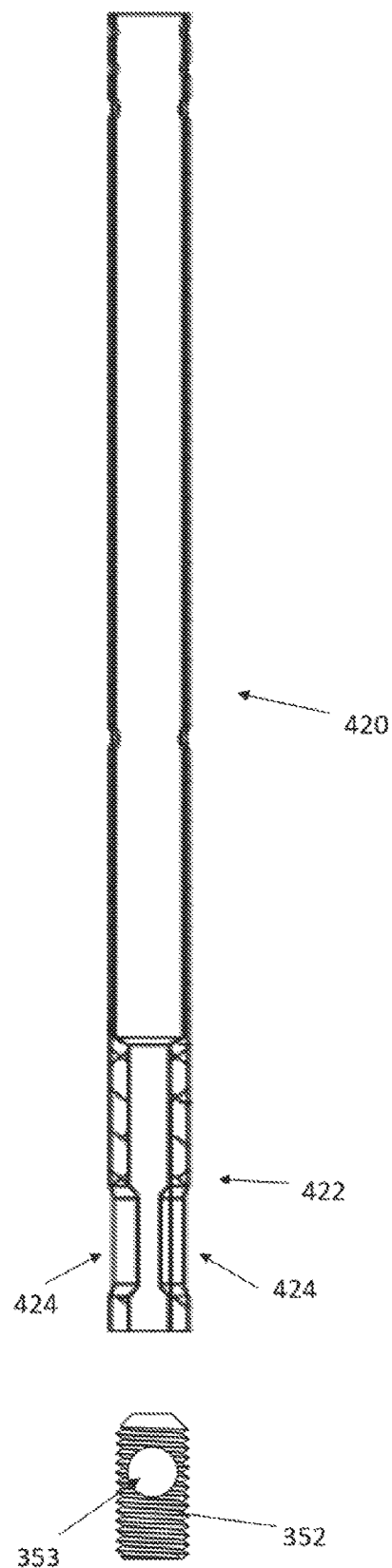

Now referring to FIGS. 5A to 6, the outlet 250 and shaft receiving sleeve 322 can define a transitional section 330 therebetween. The transitional section 330 is defined by the spacing between the outlet 250, through which the spreadable material flows into the inner channel 314, and an upper (free) end of the shaft receiving sleeve 322. It should be understood that the size of the transitional section 330 is adjustable to control the rate at which the spreadable material travels from the container 200 to the spreading mechanism 300. In some embodiments, the spreading assembly 100 includes a flow adjustment mechanism 350 adapted to effectively adjust the size of the transitional section 330 and thus control the rate at which the spreadable material enters the dispersion tube 310. In some embodiments, the flow adjustment mechanism 350 can displace the dispersion tube 310 vertically with respect to the container 200 to adjust the size of the transitional section 330. More specifically, the flow adjustment mechanism 350 can displace the dispersion tube 310 upwardly (i.e. closer to the protective shell 430) to restrict the transitional section 330, thus reducing the flow of spreadable material (FIG. 5A), or downwardly (i.e. away from the protective shell 430) to expand the transitional section 330, and increase the flow of spreadable material (FIG. 5B).

In an alternative embodiment (not shown), the protective shell 430 can also be displaced vertically with respect to the dispersion tube 310 to modify the size of the transitional section 330 and thereby control the spreadable material flow into the inner channel 314.

In some embodiments, the flow adjustment mechanism 350 includes a set screw 352, operatively connected to the dispersion tube 310, and cooperating with the lower section of the shaft 422. More specifically, the bottom end of the shaft 420 can be threaded to allow the set screw 352 to effectively be screwed therein, thus adjusting the transitional section 330. As seen in FIGS. 5A and 5B, the dispersion tube 310 can be provided with a bottom hole 354 to allow the set screw 352 to be inserted within the lower section of the shaft 422 from below. In this embodiment, the set screw 352 is provided with an aperture 353 (FIG. 6) to allow the bolt, or other fastener, which connects the shaft 420 to the shaft receiving sleeve 322 to pass therethrough, thus connecting the set screw 352 to the shaft receiving sleeve 322 and shaft 420. It should be understood that the bolt operatively connects the set screw 352 with the shaft receiving sleeve 322 (i.e., with the dispersion tube 310), therefore allowing adjustment of the dispersion tube 310 by screwing, or unscrewing, the set screw 352 from within the shaft 420. It should be further understood that the lower section 422 of the shaft 420 can be provided with an elongated window 424 adapted to allow the set screw 352 to move within the shaft 420 while simultaneously being connected to the shaft receiving sleeve 322 via the bolt, or any other suitable fastener. In other words, the fastener (i.e., the bolt) extends through the elongated window 424, through the set screw aperture 353, and through the shaft receiving sleeve 322, effectively connecting these components to one another.

In an alternative embodiment, the flow adjustment can vary from the embodiment described above in reference to the accompanying figures.

Figure 7:
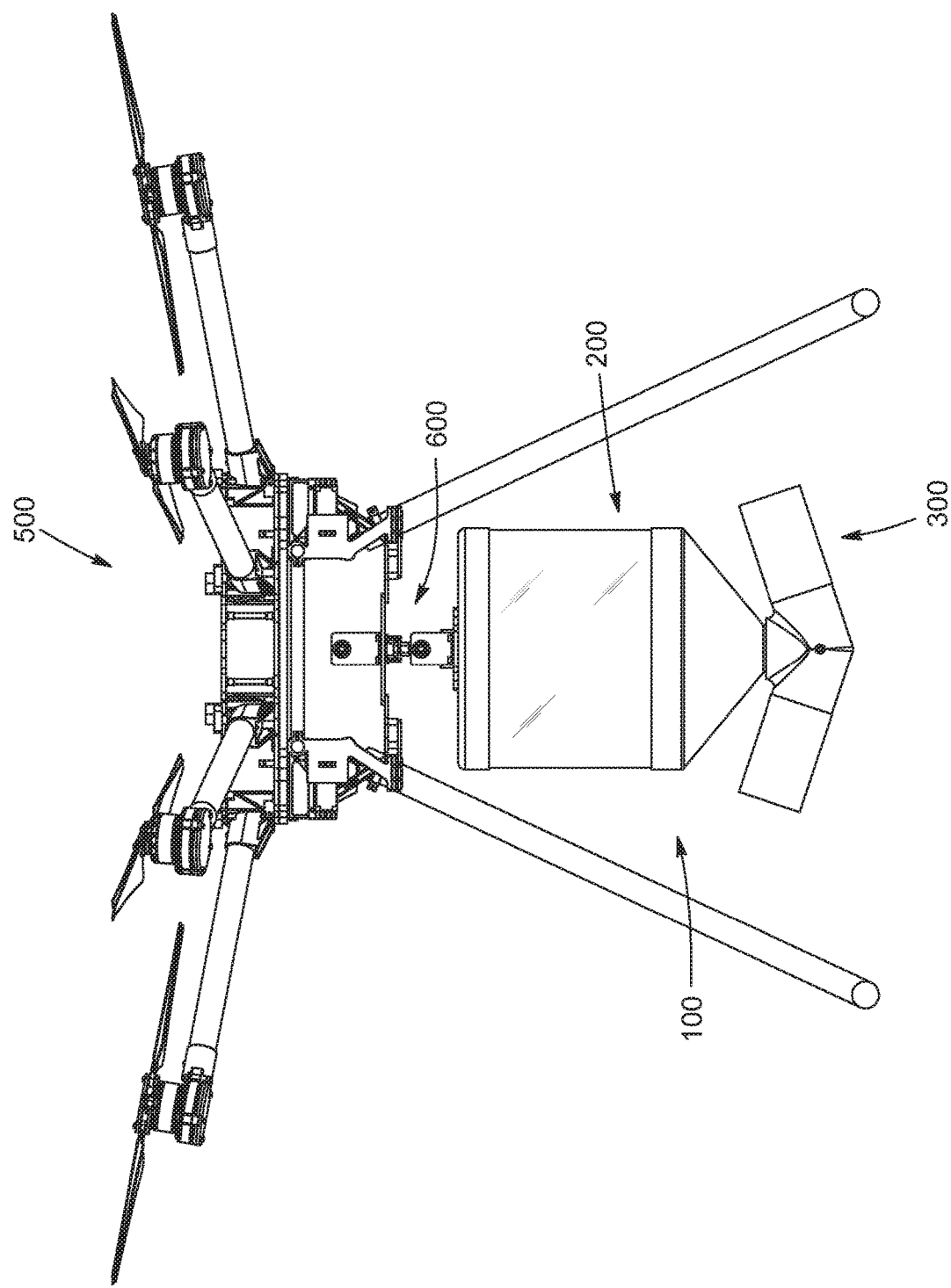
Figure 8B:
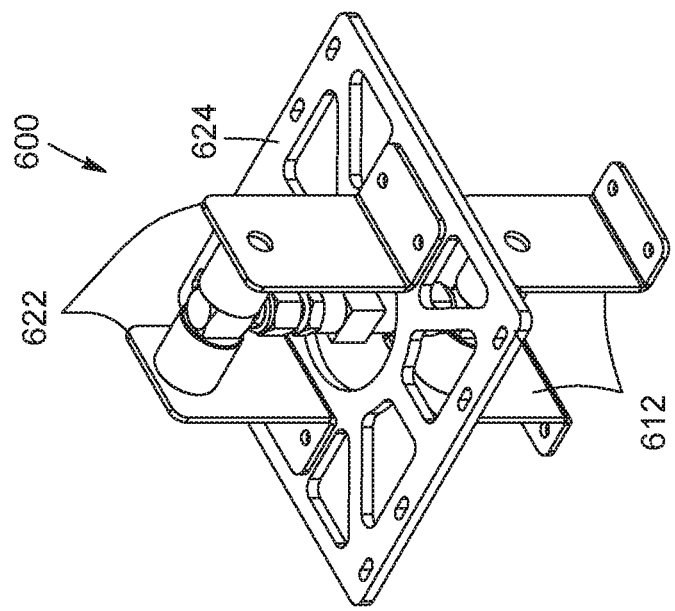
Figure 8A:
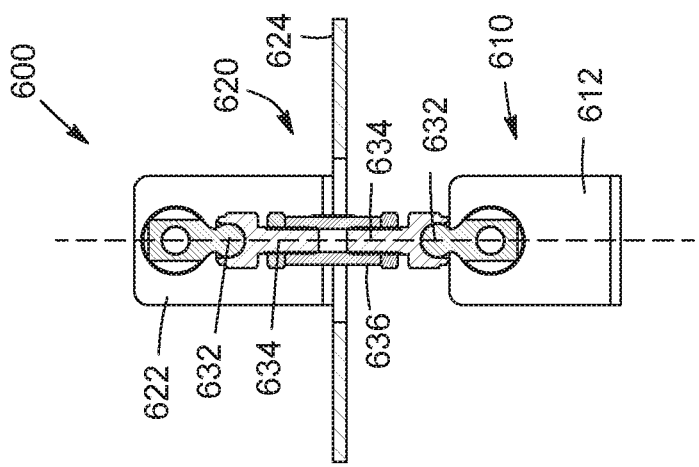
Figure 8:
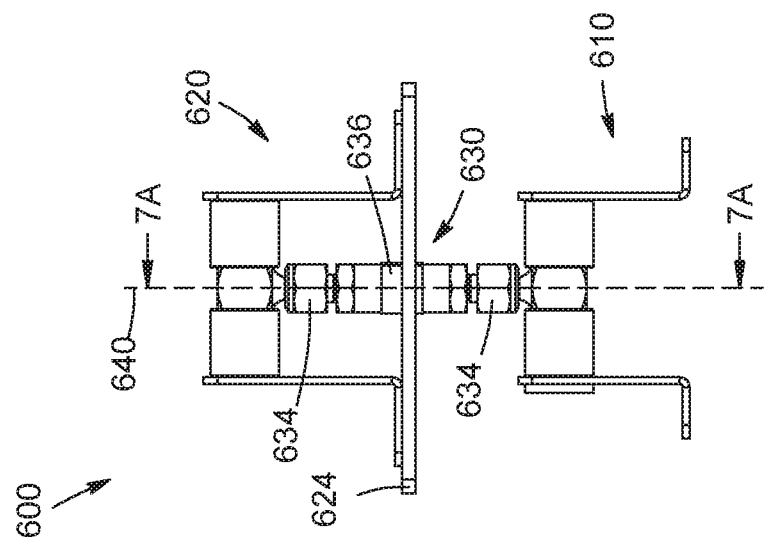

With reference to FIGS. 7 to 8B, in addition to FIG. 1, the spreading assembly 100 can further include a coupling assembly 600 adapted to engage the assembly 100 with the UAV 500. In this embodiment, the coupling assembly 600 is attached on the lid 220 of the container 200 so as to allow the spreading assembly 100 to be engaged with the UAV 500, such as in an upright position. However, it is appreciated that the coupling assembly 600 can be provided on any other suitable section of the container 200 such as the main body 210 or bottom portion 230. In this embodiment, the coupling assembly 600 is adapted to maintain the shaft 420 of the spreading assembly 100 substantially perpendicular to the ground, independently from the UAV's altitude. More specifically, the coupling assembly 600 includes a spreader attachment 610 configured to be fixedly attached to (or secured to) the lid 220 of the container 200, a UAV attachment 620 configured to be fixedly attached to (or secured to) the UAV 500 and an attachment coupler 630 (embodied as a coupling rod 630 in the embodiment shown) joining said connections 610, 620 to one another, effectively connecting the spreading assembly 100 to the UAV 500. In some embodiments, the coupling rod 630 can also define at least one pivot axis 640 around which the UAV can pivot with respect to the spreading assembly 100 to provide stability to the spreading assembly 100 while operating the UAV 500.

Referring more specifically to FIGS. 8 to 8B, the spreader attachment 610 can be attached to the spreading assembly 100 via a pair of L-shaped brackets 612 which are fastened to the lid 220 of the container 200 using mechanical fasteners such as nuts and bolts for example. In an alternative embodiment, it is appreciated that the spreader attachment 610 can be welded to the lid 220. Additionally, the UAV attachment 620 includes a UAV connector 624 securable to the UAV 500, and further includes a second pair of L-shaped brackets 622 which are fastened to the UAV connector 624. Alternatively, the attachments 610, 620 can be of any suitable shape and size and can be attached to the spreading assembly and/or UAV using any suitable fastener or fastening method. In this embodiment, each pair of brackets 612, 622 is adapted to secure one end of the coupling rod 630 to the corresponding attachment 610, 620 of the coupling assembly 600, through a respective ball joint 632. More particularly, in this embodiment, at each end thereof, the coupling rod 630 includes a ball joint 632, each one defining a pivoting axis 640 of the coupling attachment, and a ball joint attachment 634. Each ball joint attachment 634 being attachable to one another via a central fastener 636 and being adapted, in combination with the ball joints 632, to allow substantially independent movement of the UAV 500 with respect to the spreading assembly 100. More particularly, the ball joints 632 define pivot axes around which the UAV can pivot without affecting the position of the spreading assembly 100.

Figure 9:
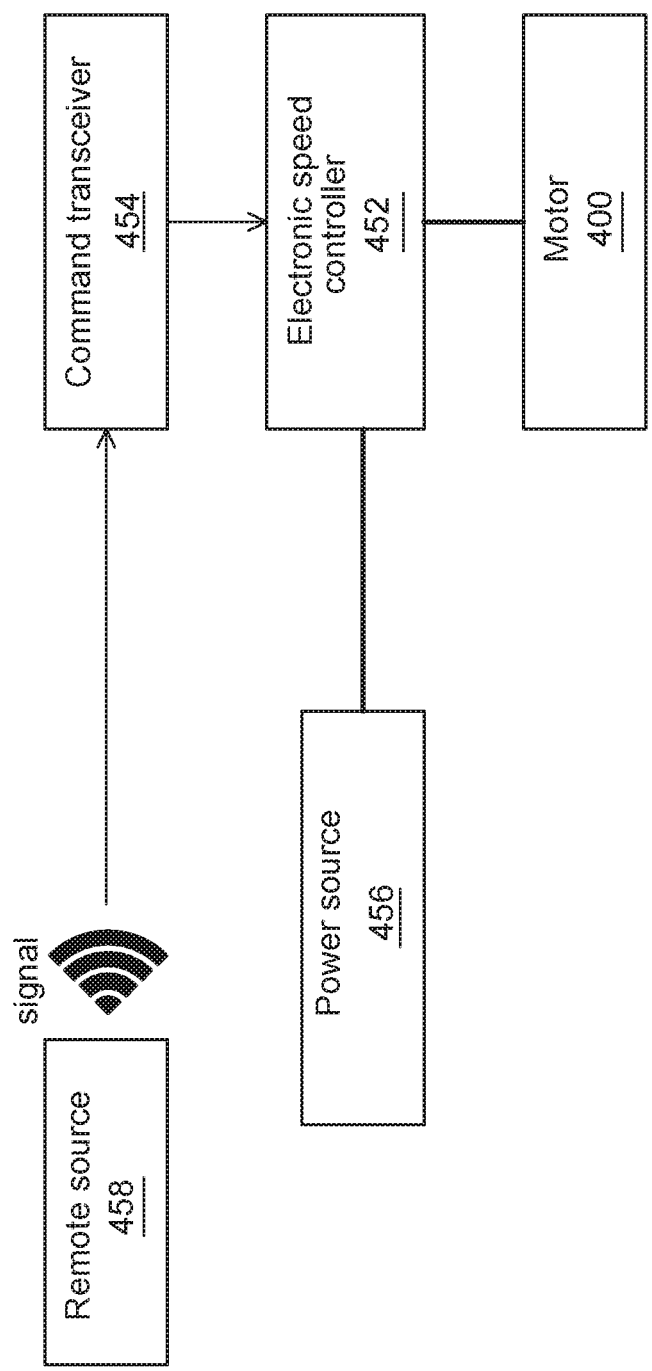

Now referring to FIG. 9, the spreading assembly 100 further includes a control assembly 450 operatively connected to the motor 400 to remotely control the operation of said motor 400. More specifically, the control assembly 450 includes an electronic speed controller (ESC) 452, a command transceiver 454 and a power source 456, such as a battery pack for example. In this embodiment, the ESC 452 is adapted to control the speed at which the motor 400 operates, effectively regulating the speed at which the spreadable material exits the dispersion tube 310, and therefore controls the distance traveled by the spreadable material. Furthermore, the ESC 452 is in data communication with the command transceiver 454 and controls the motor 400 via a control signal transmitted from said command transceiver 454. In the present embodiment, the command transceiver 454 is adapted to acquire the control signal from a remote source 458 and transmit said signal to the ESC 452. Finally, it should be understood that the power source 456 is configured to supply power to the ESC 452 in order to operate the motor 400.

In addition, the UAV can also be provided with a mean to allow the user to remotely control said UAV such as a UAV controller. In a possible embodiment, the control assembly 450 and the UAV controller can share the same command transceiver 454 or "receiver" and can therefore be operated by a single remote control. Alternatively, the control assembly 450 can be operated by a first remote control and the UAV controller can be operated by a second remote control.

Referring back to FIG. 1, the lid 220 of the container 200 can further include a battery tray 270 to secure the power source 456 therein and a controller tray 280 to secure the ESC 452. In this embodiment, the battery tray 270 and the controller tray 280 are illustratively provided on the lid 220, on opposite sides of the motor receiving sleeve 222 housing the motor 400. Alternatively, the battery and controller trays can have any suitable housing located at any suitable location on the spreading assembly 100, or directly on the UAV 500.

While the invention has been described in conjunction with the exemplary embodiment described above, many equivalent modifications and variations will be apparent to those skilled in the art when given this disclosure. Accordingly, the exemplary embodiment set forth above is considered to be illustrative and not limiting. The scope of the claims should not be limited by the embodiment set forth in this disclosure, but should be given the broadest interpretation consistent with the description as a whole.

The invention claimed is:

1. A spreading assembly for dispersing spreadable material, the spreading assembly comprising:
a spreadable material container defining a container interior volume and having at least one material outlet opening in material communication with the container interior volume and through which the spreadable material contained in the container interior volume can exit;

a spreading mechanism rotatably mounted to the spreading container and including a dispersion tube having at least a section extending outwardly of the spreadable material container, the dispersion tube having at least one inlet aperture being in material communication with the container interior volume to allow a flow of the spreadable material between the container interior volume and the dispersion tube, the dispersion tube having at least one outlet aperture through which the spreadable material can exit the dispersion tube and be dispersed in an area surrounding the spreading assembly and an inner channel in material communication with the at least one material outlet opening; and a motor operatively connected to the dispersion tube of the spreading mechanism to engage the dispersion tube in rotation; and wherein the inner channel of the dispersion tube is configured to retain the spreadable material therein when the spreading mechanism is not engaged in rotation.

2. The spreading assembly according to claim 1, wherein the spreadable material container comprises a coupling assembly engageable with an unmanned aerial vehicle ("UAV").

3. The spreading assembly according to claim 2, wherein the coupling assembly comprises a spreader attachment secured to the spreading assembly, a UAV attachment secured to the UAV and an attachment coupler connecting the UAV attachment and the spreader attachment together and defining at least one pivot axis between the UAV attachment and the spreader attachment in order to maintain the spreading assembly in a substantially upright position.

4. The spreading assembly according to claim 2, wherein the spreadable material container comprises a lid having at least one inlet opening through which the spreadable material can be fed into the container interior volume, and wherein the coupling assembly is connected to the lid.

5. The spreading assembly according to claim 1, wherein the at least one material outlet opening is defined in a bottom portion of the spreadable material container.

6. The spreading assembly according to claim 5, wherein the bottom portion of the spreadable material container is tapered inwardly to direct the spreadable material towards the at least one material outlet opening.

7. The spreading assembly according to claim 1, wherein the spreading mechanism is rotatable about 360 degrees to spread the spreadable material in an area surrounding the spreading assembly.

8. The spreading assembly according to claim 1, wherein the at least one outlet aperture comprises two outlet apertures disposed at opposite ends of the dispersion tube.

9. The spreading assembly according to claim 8, wherein a distance between a nadir of the dispersion tube and one of the outlet apertures is between about 3 cm and about 100 cm.

10. The spreading assembly according to claim 1, wherein the dispersion tube is V-shaped.

11. The spreading assembly according to claim 10, wherein the V-shaped dispersion tube defines an inner angle between about 60 degrees and about 179 degrees.

12. The spreading assembly according to claim 11, further comprising a shaft operatively connected to the motor, the shaft extending within the container interior volume and being operatively connected to the dispersion tube at a nadir thereof.

13. The spreading assembly according to claim 12, wherein a lower section of the shaft extends through the material outlet opening with a diameter of a section of the shaft extending through the material outlet opening being smaller than a diameter of the material outlet opening to allow the spreadable material contained in the container interior volume to exit through the material outlet opening and flow into the dispersion tube.

14. The spreading assembly according to claim 13, further comprising a flow adjustment mechanism adapted to control the rate at which the spreadable material exits the container interior volume and flows into the dispersion tube.

15. The spreading assembly according to claim 14, wherein the lower section of the shaft is threaded, and wherein the flow adjustment mechanism comprises a set screw operatively engaged with the dispersion tube and extending within the lower section of the shaft to selectively displace the dispersion tube with respect to the spreadable material container by rotation thereof.

16. The spreading assembly according to claim 12, wherein the motor and shaft comprise a protective shell secured to the spreadable material container and extending through the container interior volume, the protective shell surrounding and isolating a bottom portion of the motor and a section of the shaft from the spreadable material contained in the container interior volume.

17. The spreading assembly according to claim 16, wherein the protective shell comprises at least one shell opening defined in a lower section thereof to allow the spreadable material contained in the container interior volume to flow therethrough and into the material outlet opening of the spreadable material container.

18. The spreading assembly according to claim 16, wherein the shaft comprises at least one shaft stabilizer mounted within the protective shell, along the shaft, to stabilize movements of the shaft, the at least one shaft stabilizer comprising at least one bearing surrounding the shaft and contacting the protective shell.

19. The spreading assembly according to claim 1, wherein the inner channel of the dispersion tube has a diameter between about 1 cm and about 20 cm.

20. The spreading assembly according to claim 1, further comprising a control assembly operatively connected to the motor to control same and the control assembly comprises an electronic speed controller (ESC) operatively connected to the motor for controlling same, and a power source operatively connected to the ESC to supply power thereto and being in data communication with a command transceiver to receive a control signal therefrom.

21. An unmanned aerial vehicle ("UAV") for dispersing a spreadable material over a field, the UAV comprising the spreading assembly according to claim 1, and wherein the UAV comprises a UAV controller operatively connected thereto to control same.

22. A method for spreading spreadable material in an area, the method comprising the steps of:
   providing a spreading assembly according to claim 1;
   coupling the spreading assembly to an unmanned aerial vehicle ("UAV"); and
   remotely controlling the UAV and the spreading assembly via remote control to spread the spreadable material.

\* \* \* \* \*